(12) United States Patent
Smit et al.

(10) Patent No.: US 11,417,470 B2
(45) Date of Patent: Aug. 16, 2022

(54) POWER ELECTRONICS DEVICE

(71) Applicant: Valeo Siemens eAutomotive Germany GmbH, Erlangen (DE)

(72) Inventors: Arnoud Smit, Erlangen (DE); Daniel Zitzmann, Lauf a.d. Pegnitz (DE); Harald Hofmann, Nuremberg (DE)

(73) Assignee: VALEO SIEMENS EAUTOMOTIVE GERMANY GMBH, Erlangen (DE)

( * ) Notice: Subject to any disclaimer, the term of this patent is extended or adjusted under 35 U.S.C. 154(b) by 85 days.

(21) Appl. No.: 16/762,327

(22) PCT Filed: Nov. 8, 2018

(86) PCT No.: PCT/EP2018/080564
§ 371 (c)(1),
(2) Date: May 7, 2020

(87) PCT Pub. No.: WO2019/092077
PCT Pub. Date: May 16, 2019

(65) Prior Publication Data
US 2021/0110978 A1 Apr. 15, 2021

(30) Foreign Application Priority Data
Nov. 10, 2017 (DE) .................. 10 2017 126 394.2

(51) Int. Cl.
*H01G 4/38* (2006.01)
*H01G 2/04* (2006.01)
(Continued)

(52) U.S. Cl.
CPC ............. *H01G 4/38* (2013.01); *H01G 2/04* (2013.01); *H01G 4/005* (2013.01); *H01G 4/32* (2013.01)

(58) Field of Classification Search
CPC ............ H10G 4/38; H01G 2/04; H01G 4/005; H01G 4/32
(Continued)

(56) References Cited

U.S. PATENT DOCUMENTS

| 3,806,766 | A | * | 4/1974 | Fanning | ............... | H01G 4/32 |
| | | | | | | 361/782 |
| 2006/0104006 | A1 | * | 5/2006 | Saito | ............... | H01G 4/32 |
| | | | | | | 361/301.3 |

(Continued)

FOREIGN PATENT DOCUMENTS

| CN | 105680266 A | * | 6/2016 | ............ H01R 25/16 |
| DE | 10 2008 050 452 A1 | | 4/2010 | |
| DE | 10 2011 007 307 A1 | | 10/2012 | |

OTHER PUBLICATIONS

PCT/ISA/210, "International Search Report for International Application No. PCT/EP2018/080564," dated Dec. 11, 2018.

*Primary Examiner* — Arun Ramaswamy
(74) *Attorney, Agent, or Firm* — Manabu Kanesaka

(57) ABSTRACT

The invention relates to a DC link capacitor module (1, 1'), in which a coil (4, 5) is electrically conductively attached to two mutually opposite electrode plates (2a, 2b), wherein a plurality of first connecting means (6) are provided on each electrode plate (2a, 2b) to produce a detachable or non-detachable plug-in connection to second connecting means (9a, 9b), which correspond thereto and are attached to a bus bar (7a, 7b) of a power electronics module (8).

11 Claims, 6 Drawing Sheets

(51) Int. Cl.
*H01G 4/005* (2006.01)
*H01G 4/32* (2006.01)

(58) Field of Classification Search
USPC ...... 361/301.5, 530, 531, 541, 306.1, 306.2, 361/328
See application file for complete search history.

(56) References Cited

U.S. PATENT DOCUMENTS

2011/0102966 A1   5/2011  Takeoka et al.
2011/0228442 A1*  9/2011  Zhang .................... H01G 4/18
                                                                361/311

* cited by examiner

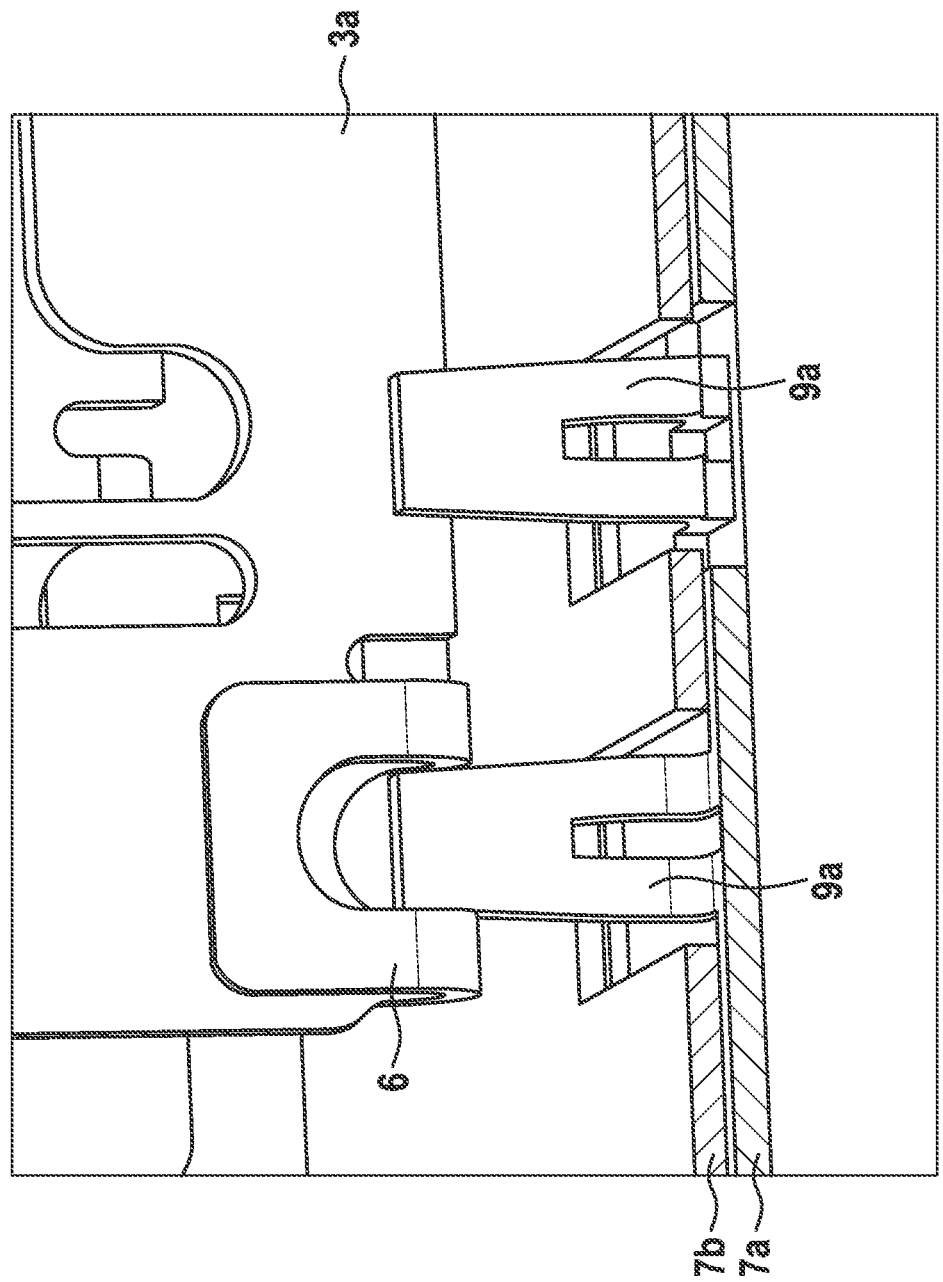

POWER ELECTRONICS DEVICE

RELATED APPLICATIONS

The present application is National Phase of International Application No. PCT/EP2018/080564 filed Nov. 8, 2018, and claims priority from German Application No. 10 2017 126 394.2, filed Nov. 10, 2017, the disclosure of which is hereby incorporated by reference herein in its entirety.

The invention relates to a power electronics device, in particular for use in electric vehicles.

According to the prior art, power electronics devices, for example charging devices for energy stores, inverters or DC-DC converters are generally known. Such a power electronics device comprises a constant-voltage DC link with a DC link capacitor.

Power electronic devices with a constant-voltage DC link, which are intended, for example, for applications in vehicles with combined or exclusive electric drive often use very powerful power semiconductors or power semiconductor modules. These are capable of switching large electrical power as required by means of high switching speeds by means of partially complex control procedures and suitable actuation methods. However, the rapid switching of high currents on the constant-voltage DC link often leads to undesired voltage peaks during a switch-off process of the power semiconductor or power semiconductor modules, in combination with inductances, especially line inductances, which are inherent in the design. In most cases, high-frequency switching operations of the power semiconductors or power semiconductor modules on the constant-voltage DC link still cause impairments of the electromagnetic compatibility.

It is known to counteract these undesirable electrical effects by using the DC link capacitor in the constant-voltage DC link. The success of this measure depends in particular on establishing the best possible electrical and mechanical connection of the DC link capacitor to the power semiconductor or power semiconductor modules by means of appropriate assembly and connection technologies.

A DC link capacitor is usually formed from two mutually opposite electrode plates, between which one or more coils are held. Each coil has two mutually opposite end faces that are electrically contactable by means of shooping. The shooped end faces are usually soldered or welded to the corresponding electrode plate. The electrode plate in turn is firmly connected to a bus bar, which has a terminal element for connection to an external circuit, cable or the like. In certain embodiments, the electrode plate with the coils held between them and the bus bars, with the exception of the terminal elements provided therein, are encapsulated in a potting compound. DC link capacitors are usually purchased by manufacturers of power electronics devices from suppliers who manufacture the DC link capacitors according to the manufacturers' specifications. If a manufacturer's specifications are changed, it is therefore necessary for the supplier to produce a correspondingly adapted DC link capacitor. This is cumbersome and costly.

The object of the invention is to eliminate the disadvantages according to the prior art. In particular, a power electronics device which may be manufactured with reduced effort shall be described.

This object is achieved by the features of claims 1, 6 and 11. Expedient embodiments of the invention result from the features of the dependent claims.

According to a first aspect of the invention, a DC link capacitor module is proposed, in which a coil is attached in an electrically conductive manner to two mutually opposite electrode plates, wherein a plurality of first connecting means for producing a detachable or non-detachable plug connection with corresponding second connecting means attached to a bus bar of a power electronics module are provided on each electrode plate.

The proposed DC link capacitor module does not have bus bars, in deviation from the prior art. Only first connecting means are provided on each electrode plate, and are suitable for connection to second connecting means provided on the bus bars. This makes it possible to mount the bus bars with the second connecting means provided thereon in the power electronics module and then, in a later production step, to connect the DC link capacitor module to the bus bars electrically conductively by means of a simple plug connection.

The DC link capacitor module may have further coils that are electrically conductive attached to the electrode plates. The DC link capacitor module may be provided by the supplier with a different number of coils and/or coils with different properties, depending on the requirements of the manufacturer of power electronics devices. Irrespective of this, the geometry of the electrode plates and the arrangement and design of the first connecting means may be retained. This makes it possible for the manufacturer to quickly and easily mount DC link capacitor modules, which for example have a different capacitance, while retaining the mounting geometry of the bus bars attached to the power electronics module. On the part of the supplier, the costly and time-consuming step of mounting the bus bar to the electrode plates is eliminated. Apart from this, such DC link capacitor modules may also be provided by the supplier in smaller units, a number of which may then be mounted on the bus bars by the manufacturer using the plug connection.

In accordance with a particularly advantageous embodiment, the first connecting means is formed integrally with the electrode plate. The first connecting means may be produced in one piece with the electrode plate, for example by means of stamping, laser cutting and bending technology. In particular, the first connecting means may be designed in the manner of a socket or tab suitable for receiving a contact pin. The socket or tab may, for example, comprise a clamping spring or the like.

In accordance with a further advantageous embodiment, a first pair of electrode plates formed from the electrode plates with the first coil received in between and a second pair of electrode plates formed from two further mutually opposite electrode plates with one or more second coil received in between are provided in parallel arrangement. The proposed subdivision of the DC link capacitor module into a first and a second pair of electrode plates, each with coils held between them, makes it possible to reduce the areas spanned between the electrode plates while maintaining a predetermined geometry. As a result, a leakage inductance of the DC link capacitor module is reduced. Such a DC link capacitor module is suitable for particularly fast switching operations.

In accordance with a second aspect of the invention, a power electronics module with at least two bus bars is proposed, wherein second connecting means are provided on each bus bar for establishing a detachable or non-detachable plug connection to corresponding first connecting means attached to a DC link capacitor module according to the invention.

The proposed power electronics module may advantageously be produced by the manufacturer initially without the DC link capacitor module. It may be quickly and easily connected to the DC link capacitor module in a later production step by establishing a plug connection. As a result, it is possible, for example, for the manufacturer to mount the bus bars in such a way that they are attached close to a cooling device or are in direct contact with a cooling device. The bus bars may each be provided with a standardised arrangement at second connecting means. This makes it possible to mount one or more geometrically appropriately adapted DC link capacitor modules on the bus bars.

The bus bars may be mounted in an opposing arrangement, in particular in sandwich-like fashion. One bus bar may have apertures for the passage of the second connecting means of the other bus bar.

In accordance with an advantageous embodiment, the second connecting means is designed in the manner of a contact pin extending from the bus bar, which may be inserted frictionally into the first connecting means. The term "contact pin" is to be understood in the present context in general terms, i.e. it may also be formed by one or more contact tongues arranged next to each other, which, for example, are rectangular, trapezoidal or pointed in plan view. The contact pin may also be formed as a pin or pipe socket. It may be round, square or rectangular in cross-section.

The second connecting means is expediently formed in one piece with the bus bar. The second connecting means may be formed for example by stamping, laser cutting and bending.

The bus bar may have a terminal element for connection to a supply line, a circuit or the like. For example, this is a terminal lug with an aperture for the passage of a fastening element, such as a screw, threaded bolt or the like.

The power electronics module is preferably formed as a charging device for an electrical energy store, as an inverter or as a DC-DC converter.

In accordance with a third aspect of the invention, a power electronics device is proposed in which a DC link capacitor module according to the invention is connected to the bus bars of a power electronics module according to the invention by means of a plug connection.

Such a power electronics device may be produced with reduced outlay. Depending on the requirements, it may also be combined with a plurality of DC link capacitor modules having the same or different capacitance, dielectric strength, leakage inductance and the like. Furthermore, the proposed separation of the bus bars from the DC link capacitor module may be used to achieve improved cooling of the DC link capacitor module. The bus bars may be mounted in the power electronics module by the manufacturer in such a way that they may be cooled with improved efficiency.

The power electronics device according to the invention may further comprise a cover element which encloses the coils in a gas-tight manner. The cover element protects the coils from moisture and heat, which may damage the coils, especially during transport. The cover element is particularly preferably deformable in order to enable pressure equalisation without gas exchange between the coils accommodated inside the cover element and the surrounding environment. In particular, this makes it possible to dispense with the commonly used disposable metallised foils into which conventional coils are welded during transport.

In addition, the power electronics device may comprise a sealing element sealing the cover element with respect to a bus bar. In this case the cover element may rest on the bus bar.

In accordance with an advantageous embodiment, a connection established between the first and second connecting means is detachable or non-detachable. For example, a plug connection first established to mount the DC link capacitor module may be left as it is. This is then a detachable connection. It is also conceivable, however, that once the plug connection has been established, for example the second connecting means is deformed so that the connection becomes non-detachable, i.e. may not be detached without deforming or destroying the connecting means.

Advantageous embodiments of the invention will be explained in greater detail hereinafter on the basis of the drawings, in which:

FIG. 3a shows a perspective sectional view of first and second connecting means in a first position;

Figure 1:
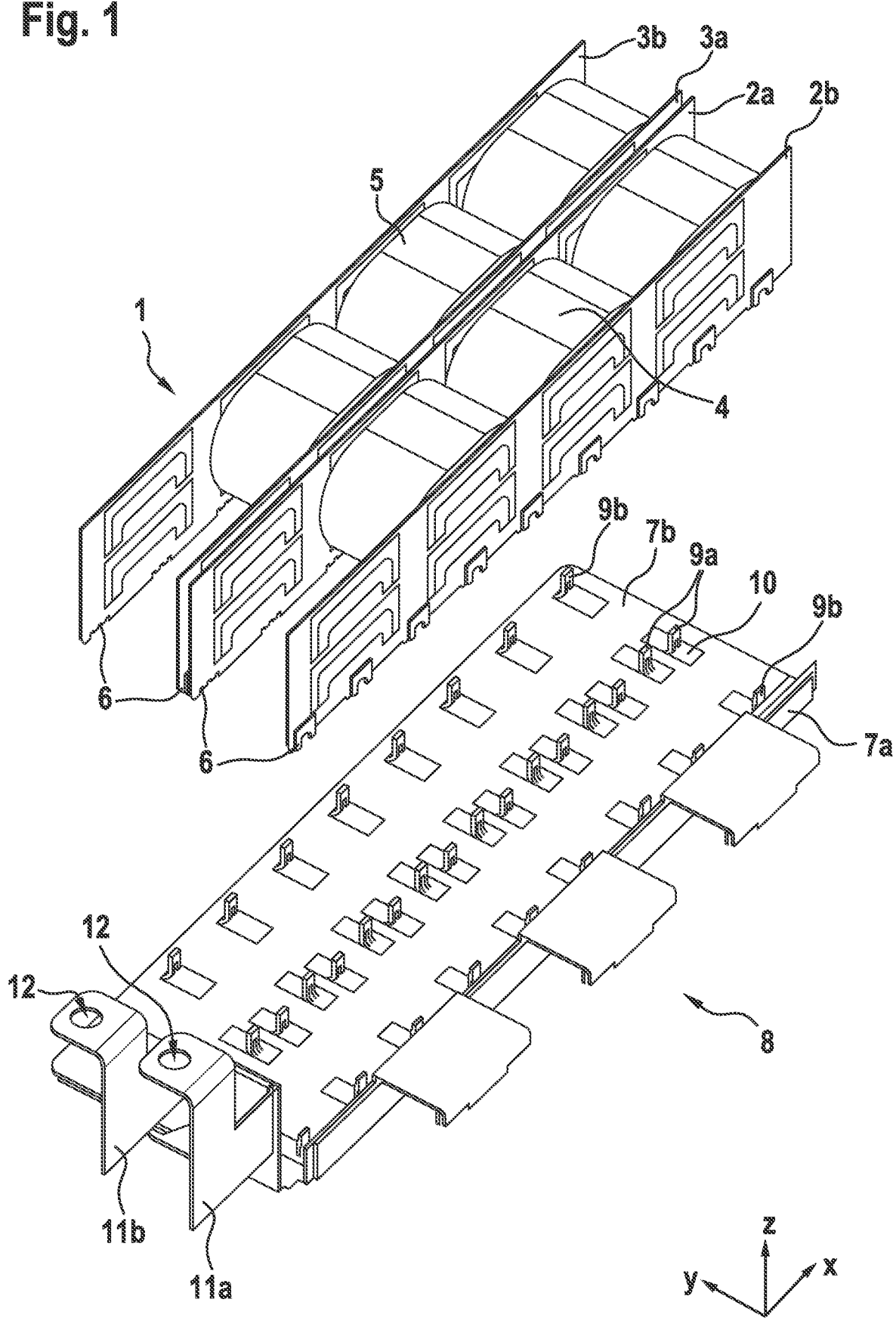
FIG. 1 shows a partial perspective view of a first power electronics device.

FIG. 1 shows a DC link capacitor module generally denoted by the reference sign 1. The DC link capacitor module 1 has a first electrode plate 2a and a second electrode plate 2b, which are arranged opposite each other and form a first electrode plate pair 2, and a third electrode plate 3a and a fourth electrode plate 3b, which are also arranged opposite each other and form a second electrode plate pair 3. Between the first pair of electrode plates 2 there are a plurality of first coils 4, and between the second pair of electrode plates 3 there are second coils 5. The coils 4, 5 are shooped on the front side. By means of soldering, welding or another joining technique, the coils 4 are connected to the electrode plates 2a, 2b and the coils 5 to the electrode plates 3a, 3b.

The electrode plates 2a, 2b, 3a, 3b are each provided with first connecting means 6. The first connecting means 6 are bent tabs which are formed here in one piece with the electrode plates 2a, 2b, 3a, 3b.

FIG. 1 also shows a first bus bar 7a and a second bus bar 7b (here partially covered) of a power electronics module 8. The bus bars 7a, 7b are arranged electrically insulated from each other in sandwich-like fashion. Second connecting means 9a, 9b extend from the bus bars 7a, 7b and are designed in the manner of a plug-in tab. The second connecting means 9a extending from the first bus bar 7a pass through apertures 10 in the second bus bar 7b.

The first connecting means 6 and the second connecting means 9a, 9b are correspondingly designed to produce a detachable or non-detachable plug connection. An arrangement of the first connecting means 6 on the DC link capacitor module 1 corresponds to the arrangement of the second connecting means 9a, 9b on the bus bars 7a, 7b so that the plug connection may be established between all first connecting means 6 and all second connecting means 9 when the DC link capacitor module 1 is placed on the bus bars 7a, 7b.

The first bus bar 7a is connected to a first terminal element 11a. The second bus bar 7b is connected to a second terminal element 11b. The terminal elements 11a and 11b each have an aperture 12, through which, for example, screws may be guided for connection to power lines.

The arrangement of the bus bars 7a, 7b shown in FIG. 1 is a fixed part of the power electronics module 8 The DC link capacitor module 1 may be connected to the power electronics module 8 by means of the plug connection to form a power electronics device 14.

Figure 2:
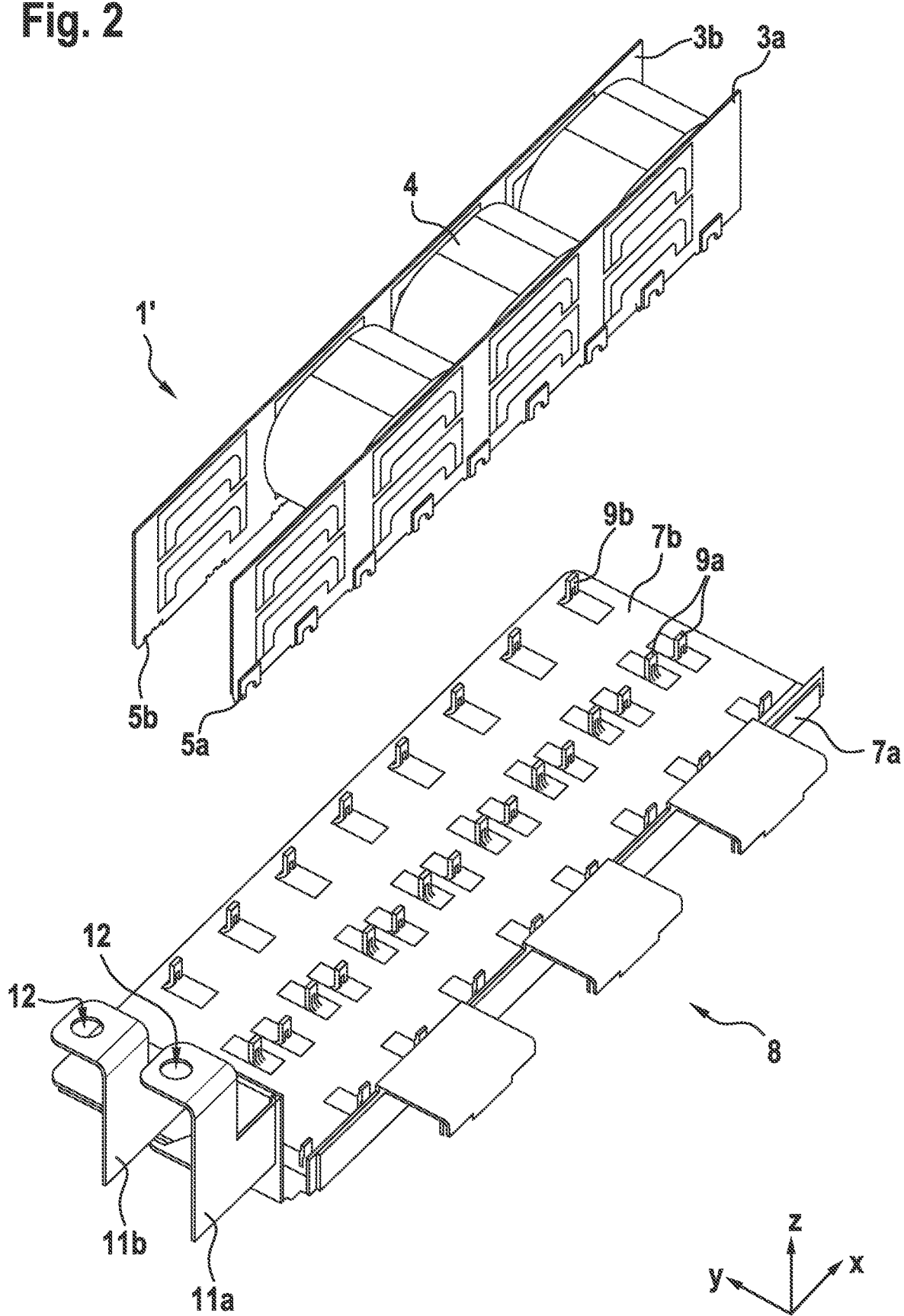
FIG. 2 shows a partial perspective view of a second power electronics device.

As can be seen in particular from FIG. 2, another differently designed DC link capacitor module 1' may be connected to the first bus bar 7a and second bus bar 7b while maintaining the same design of the bus bars 7a, 7b. The further DC link capacitor module 1' has only a first electrode plate 2a and a second electrode plate 2b, which form an electrode plate pair 2 and between which a plurality of first coils 4 are held. As the power electronics module 8 is standardised in respect of the arrangement and design of the bus bars 7a, 7b and the second connecting means 9a, 9b provided thereon, DC link capacitor modules 1, 1' designed correspondingly in respect of the arrangement and design of the first connecting means may be connected by means of the plug connection without great effort. However, the DC link capacitor modules 1, 1' may be designed differently in respect of the number and design of the electrode plates 2a, 2b, 3a, 3b and the coils 4, 5 held between them. This makes it possible to combine DC link capacitor modules 1, 1' of different capacitance, leakage inductance or the like with the power electronics module 8.

Figure 3B:
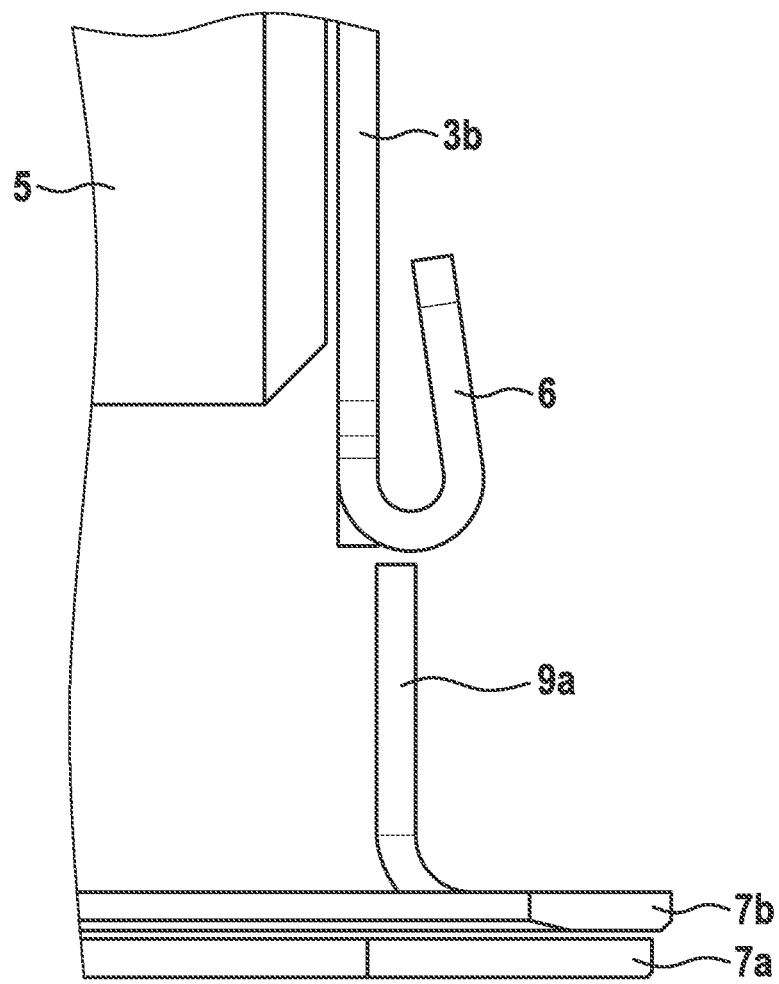
FIG. 3b shows a sectional side view of the first and second connecting means in the first position.
Figure 3C:
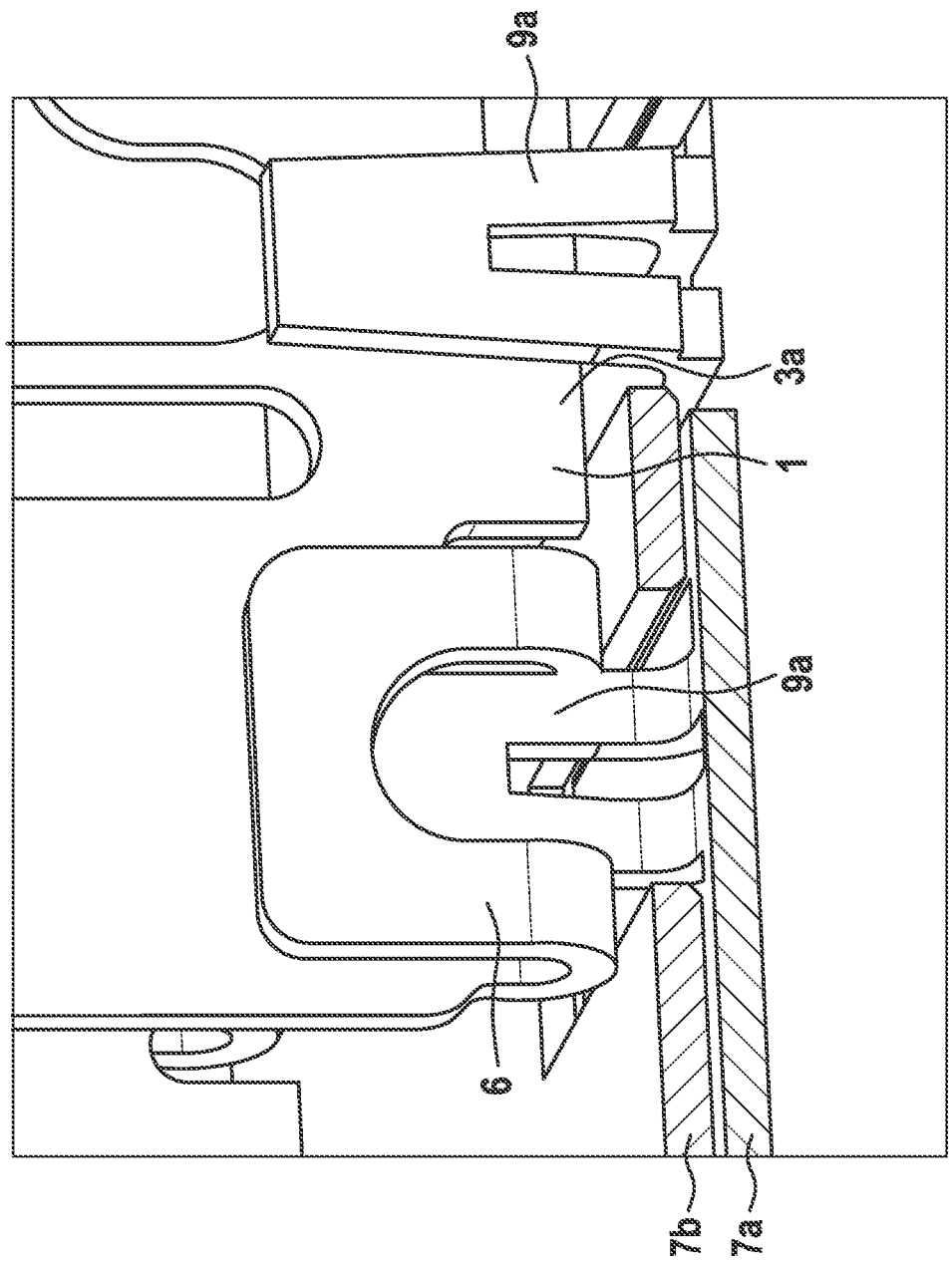
FIG. 3c shows a sectional perspective view of the first and second connecting means in a second position.

FIG. 3a shows a perspective, sectional view of a first connecting means 6 attached to an electrode plate (here the third electrode plate 3a by way of example) and a second connecting means 9a extending from a bus bar (here the first bus bar 7a by way of example) in a first position before connecting. As can be seen in particular in conjunction with a sectional side view shown in FIG. 3b, the first connecting means 6 is here designed in the manner of a bent tab which is manufactured in one piece with the first electrode plate 2a. The second connecting means 9a consists of two tongues extending from the first bus bar 7a, which converge at a free end of the first connecting means 6. The first connecting means 6 may be inserted frictionally into the second connecting means 9a, which is designed as a tab. FIG. 3c shows the DC link capacitor module 1, which is connected to the power electronics module 8 in a second position by means of the plug connection, the second connecting means 9a having been deformed to produce the non-detachable connection. With the detachable connection, the deformation is eliminated.

Figure 4:
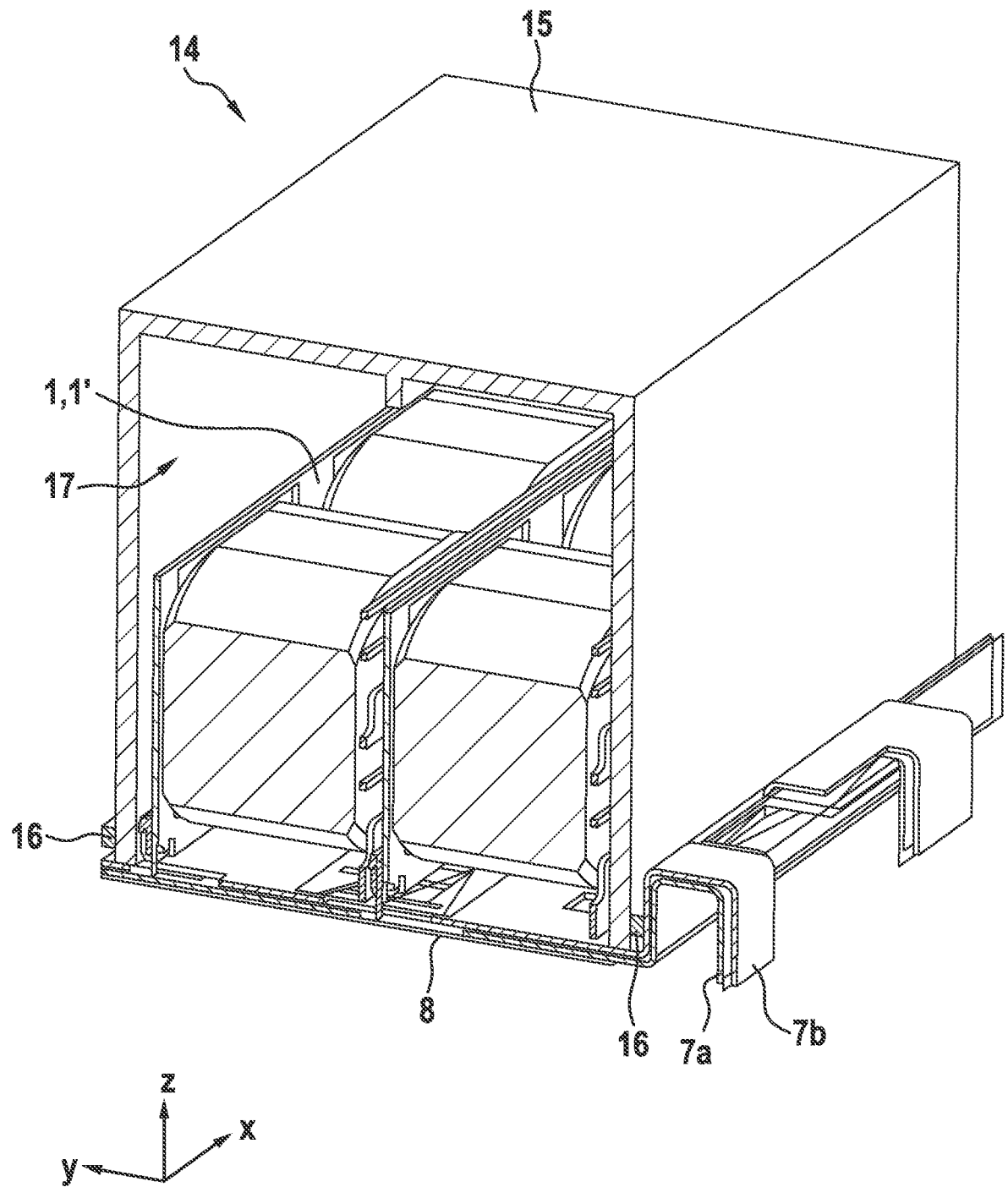
FIG. 4 shows a perspective view of a power electronics device in an assembled state.

FIG. 4 shows a partial perspective view of a power electronics device 14, which comprises the DC link capacitor module 1 connected to the power electronics module 8 and a cover element 15, in an assembled state. In addition, the power electronics module 8 comprises other power electronics components (not shown), which perform a function as a charging device for an energy store, as an inverter or as a DC-DC converter.

The cover element 15 rests on the second bus bar 7b and is sealed with respect thereto by means of a seal 16. The cover element 15 is designed to be deformable so that pressure equalisation without gas exchange between the interior 17 of the cover element, which accommodates the coils 4, 5, and the surrounding environment is possible.

The invention claimed is:

1. A power electronic device comprising:
  a DC link capacitor module having two mutually opposite electrode plates, a coil attached in an electrically conductive manner to the two mutually opposite electrode plates, and a plurality of first connecting means formed on the two mutually opposite electrode plates, and
  a power electronics module having at least two bus bars, and a plurality of deformable second connecting means attached to each of the at least two bus bars to be detachably connected to the plurality of first connecting means corresponding thereto by a plug connection,
  wherein after establishing the plug connection, the plurality of deformable second connecting means is deformed so that the plug connection cannot be detached without deforming or destroying the plurality of second connecting means.

2. The power electronic device according to claim 1, wherein each of the plurality of first connecting means is formed in one piece with the electrode plates.

3. The power electronic device according to claim 1, wherein each of the plurality of first connecting means is designed in the manner of a socket or tab suitable for receiving a contact pin.

4. The power electronic device according to claim 1, wherein the coil includes a first coil and a second coil, and a first electrode plate pair formed from the electrode plates with the first coil received therebetween and a second electrode plate pair formed from two further mutually opposite electrode plates with the second coil received therebetween are provided in parallel arrangement.

5. The power electronic device according to claim 4, wherein a first electrode plate of the first electrode plate pair is connected to a third electrode plate of the second electrode plate pair, and a second electrode plate of the first electrode plate pair is connected to a fourth electrode plate of the second electrode plate pair.

6. The power electronics device according to claim 1, wherein the plurality of second connecting means is formed integrally with the bus bars.

7. The power electronics device according to claim 1, wherein each of the plurality of second connecting means is designed in the manner of a contact pin extending from the bus bars, which are inserted into each of the plurality of first connecting means with frictional engagement.

8. The power electronics device according to claim 1, wherein each of the bus bars has a connection element for connection to a supply line.

9. The power electronics device according to claim 1, which is designed as a charging device for an electrical energy store, as an inverter or as a DC-DC converter.

10. The power electronics device according to claim 1, further comprising a deformable cover element which encloses the coil in a gas-tight manner.

11. The power electronics device according to claim 10, further comprising a sealing element sealing the cover element with respect to the bus bars.

* * * * *